US012772299B2

(12) United States Patent
Li et al.

(10) Patent No.: US 12,772,299 B2
(45) Date of Patent: Oct. 20, 2026

(54) COMMUNICATION METHOD AND APPARATUS

(71) Applicant: HUAWEI TECHNOLOGIES CO., LTD., Shenzhen (CN)

(72) Inventors: Shengyu Li, Beijing (CN); Lei Guan, Beijing (CN); Ruijie Li, Beijing (CN); Zhiheng Guo, Beijing (CN); Xinghua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 304 days.

(21) Appl. No.: 18/413,112

(22) Filed: Jan. 16, 2024

(65) Prior Publication Data

US 2024/0155698 A1 May 9, 2024

Related U.S. Application Data

(63) Continuation of application No. PCT/CN2022/099803, filed on Jun. 20, 2022.

(30) Foreign Application Priority Data

Jul. 16, 2021 (CN) ......................... 202110806913.2

(51) Int. Cl.
*H04W 74/08* (2024.01)
*H04W 74/00* (2009.01)
*H04W 74/0833* (2024.01)

(52) U.S. Cl.
CPC ..... *H04W 74/0875* (2013.01); *H04W 74/004* (2013.01); *H04W 74/0833* (2013.01); *H04W 74/0891* (2013.01)

(58) Field of Classification Search
None
See application file for complete search history.

(56) References Cited

U.S. PATENT DOCUMENTS

2013/0301486 A1* 11/2013 Kishiyama ............ H04L 5/0042 370/277
2016/0173263 A1 6/2016 Kishiyama
(Continued)

FOREIGN PATENT DOCUMENTS

CN 112970315 A 6/2021

OTHER PUBLICATIONS

Catt, "Discussion on HD-FDD operation", 3GPP TSG RAN WG1 #105-e, e-meeting, May 19-27, 2021, R1-2104528 (Year: 2021).*
(Continued)

*Primary Examiner* — Joseph A Bednash
(74) *Attorney, Agent, or Firm* — HAUPTMAN HAM, LLP

(57) ABSTRACT

A communication method and apparatus. for indicating indicate A terminal is indicated to perform second transmission when an SSB or a PRACH on a frequency domain resource overlaps with reverse transmission on another frequency domain resource in time domain. In response to the SSB or the PRACH overlapping with the second transmission in time domain, the terminal device determines, by receiving first indication information, that a priority of the SSB or the PRACH is lower than a priority of the second transmission on an overlapped time domain resource. The terminal device performs the second transmission based on the first indication information. The terminal device performs reverse transmission on a symbol that overlaps with the SSB or the PRACH.

20 Claims, 4 Drawing Sheets

(56) References Cited

U.S. PATENT DOCUMENTS

| | | | | |
|---|---|---|---|---|
| 2020/0112978 A1* | 4/2020 | Zhang | H04W 72/21 | |
| 2023/0180300 A1* | 6/2023 | Lin | H04W 74/0891 | 370/329 |
| 2024/0284361 A1* | 8/2024 | Wei | H04L 5/0078 | |

OTHER PUBLICATIONS

International Search Report issued in corresponding International Application No. PCT/CN2022/099803, dated Sep. 7, 2022, pp. 1-10.

Ericsson:"Duplex operation for RedCap."3GPP TSG-RAN WG1 Meeting#105-e, e-Meeting, May 19-27, 2021. R1-2104181, total 13 pages.

Extended European Search Report issued in corresponding European Application No. 22841130.2, dated Oct. 14, 2024, pp. 1-10.

* cited by examiner

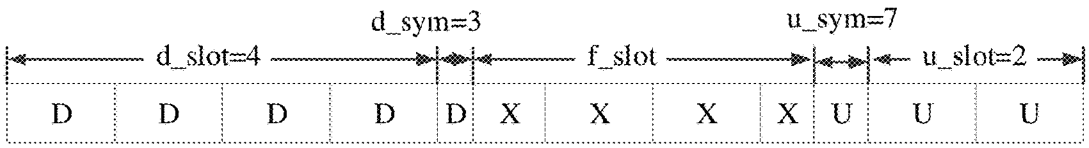
FIG. 1
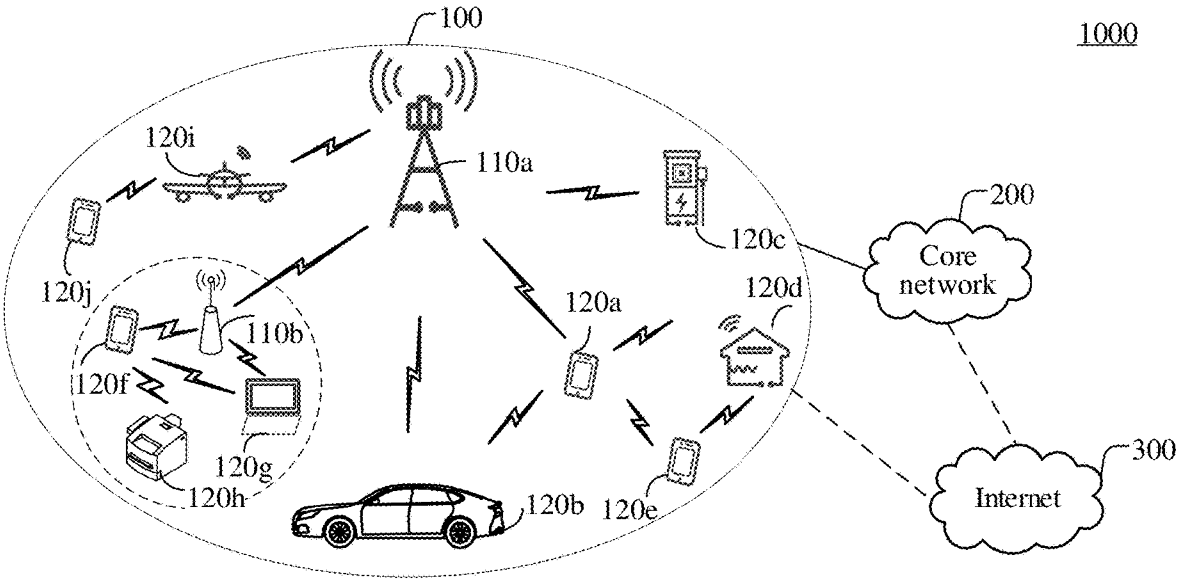
FIG. 2
| | | | | | | |
|---|---|---|---|---|---|---|
| Frequency domain resource #1 | DL | DL | DL | DL | F | UL |
| Frequency domain resource #2 | UL | UL | UL | UL | F | DL |
FIG. 3

COMMUNICATION METHOD AND APPARATUS

CROSS-REFERENCE TO RELATED APPLICATION

This application is a continuation of International Application No. PCT/CN2022/099803, filed on Jun. 20, 2022, which claims priority to Chinese Patent Application No. 202110806913.2, filed on Jul. 16, 2021. The disclosures of the aforementioned applications are hereby incorporated by reference in their entireties.

BACKGROUND

A terminal in new radio (NR) carrier aggregation (CA) performs half-duplex communication. In response to a plurality of component carriers (CCs) being configured for the terminal, in response to TDD frame structures of these CCs being different, for example, some symbols on a carrier 1 (CC #1) are downlink symbols, and some symbols at a corresponding time domain position on a carrier 2 (CC #2) are uplink symbols, behavior of the terminal in this scenario is to be specified in a communication protocol. However, terminal behavior specified in a current communication protocol does not take into account different urgency and priorities of ultra-reliable and low-latency communications (URLLC) and enhanced mobile broadband (eMBB) transmission, and consequently is difficult to apply to a URLLC scenario. This causes a large transmission latency.

SUMMARY

Embodiments described herein provide a communication method and apparatus, to reduce a data transmission latency.

According to a first aspect, a communication method is provided. The method is performed by a terminal device or performed by a chip used in a terminal device. In the method, the terminal device receives first indication information, where the first indication information indicates that a priority of first transmission on a first transmission occasion is lower than a priority of second transmission. The first transmission is a synchronization signal/physical broadcast channel block (SSB) or a physical random access channel (PRACH) on a first frequency domain resource. The second transmission is transmission on a second frequency domain resource. A transmission direction of the first transmission is different from a transmission direction of the second transmission. The first transmission occasion overlaps with a time domain resource of the second transmission. The terminal device performs the second transmission on the second frequency domain resource based on the first indication information.

Based on the foregoing solution, the terminal is indicated, by using the first indication information, that a priority of SSB or PRACH transmission on a frequency domain resource is lower than a priority of reverse transmission on another frequency domain resource. For example, on the another frequency domain resource, UE-specific transmission is configured by using higher layer signaling or scheduled by using physical layer signaling. The transmission carries high-priority data. Therefore, a priority of the transmission is higher than a priority of cell-specific transmission during initial access, for example, the SSB or the PRACH. After receiving the first indication information, the terminal performs the reverse transmission on a symbol that overlaps with the cell-specific transmission, thereby reducing a limitation of the cell-specific transmission on a transmission direction and increasing resource use flexibility.

In at least one embodiment, the first transmission is the SSB, and the second transmission is one of a PRACH, a physical uplink shared channel (PUSCH), a physical uplink control channel (PUCCH), or a sounding reference signal (SRS). Optionally, the PRACH is a contention-free PRACH, for example, PRACH transmission triggered by a network device by using a physical downlink control channel (PDCCH) order.

In at least one embodiment, the first transmission is the PRACH, and the second transmission is one of a PDCCH, a physical downlink shared channel (PDSCH), or a channel state information-reference signal (CSI-RS). Optionally, the PRACH is a contention-based PRACH, for example, PRACH transmission selected by the terminal during initial access.

In at least one embodiment, the first indication information indicates, by indicating that the first transmission fails or the first transmission occasion fails, that the priority of the first transmission on the first transmission occasion is lower than the priority of the second transmission.

Based on the foregoing solution, an explicit indication is given, for the terminal by using the first indication information, that the SSB or the PRACH indicated in a system information block (SIB) 1 during initial access fails.

In at least one embodiment, the first transmission is periodic transmission, the first transmission includes a plurality of transmission occasions, and the first transmission occasion is one of the plurality of transmission occasions. The first indication information includes grouping information of the first transmission, and is used to group the plurality of transmission occasions into M transmission occasion groups. M is an integer greater than or equal to 2. The first transmission occasion does not belong to a first group, and the first group is a group that is associated with the terminal device and that is in the M transmission occasion groups.

Based on the foregoing solution, grouping information of the SSB or the PRACH is introduced, so that SSB or PRACH transmission is grouped, and different groups correspond to different terminals or UE groups. This supports TDM transmission between different terminals or UE groups, reduces a scheduling limitation of the SSB or PRACH transmission on all terminals, and improves resource use efficiency.

In at least one embodiment, the grouping information of the first transmission includes a correspondence between an identifier of the terminal device and the M transmission occasion groups.

In at least one embodiment, the first indication information is carried in a SIB 1.

In at least one embodiment, the identifier of the terminal device is one of a 5G globally unique temporary identity (5G-GUTI), a 5G shorted-temporary mobile subscriber identity (5G-S-TMSI), or a 5G-temporary mobile subscriber identity (5G-TMSI).

In at least one embodiment, the first transmission is periodic transmission, the first transmission includes a plurality of transmission occasions, and the first transmission occasion is one of the plurality of transmission occasions. The first indication information is used to determine a first subset, the first subset is a subset of a set of the plurality of transmission occasions, and a transmission occasion in the first subset is valid for the terminal device. The first transmission occasion does not belong to the first subset.

Based on the foregoing solution, the terminal is explicitly notified of a subset of valid transmission occasions by using the first indication information. This supports TDM transmission between different terminals or UE groups, reduces a scheduling limitation of SSB or PRACH transmission on all terminals, and improves resource use efficiency.

According to a second aspect, a communication method is provided. The method is performed by a network device or performed by a chip used in a network device. In the method, the network device sends first indication information, where the first indication information indicates that a priority of first transmission on a first transmission occasion is lower than a priority of second transmission. The first transmission is an SSB or a PRACH on a first frequency domain resource. The second transmission is transmission on a second frequency domain resource. A transmission direction of the first transmission is different from a transmission direction of the second transmission. The first transmission occasion overlaps with a time domain resource of the second transmission. The network device performs the second transmission on the second frequency domain resource.

In at least one embodiment, the first transmission is the SSB, and the second transmission is one of a PRACH, a PUSCH, a PUCCH, or an SRS. Optionally, the PRACH is a contention-free PRACH, for example, PRACH transmission triggered by the network device by using a PDCCH order.

In at least one embodiment, the first transmission is the PRACH, and the second transmission is one of a PDCCH, a PDSCH, or a CSI-RS. Optionally, the PRACH is a contention-based PRACH, for example, PRACH transmission selected by a terminal during initial access.

In at least one embodiment, the first indication information indicates, by indicating that the first transmission fails or the first transmission occasion fails, that the priority of the first transmission on the first transmission occasion is lower than the priority of the second transmission.

In at least one embodiment, the first transmission is periodic transmission, the first transmission includes a plurality of transmission occasions, and the first transmission occasion is one of the plurality of transmission occasions. The first indication information includes grouping information of the first transmission, and is used to group the plurality of transmission occasions into M transmission occasion groups. M is an integer greater than or equal to 2. The first transmission occasion does not belong to a first group, and the first group is a group that is associated with a terminal device and that is in the M transmission occasion groups.

In at least one embodiment, the grouping information of the first transmission includes a correspondence between an identifier of the terminal device and the M transmission occasion groups.

In at least one embodiment, the first indication information is carried in SIB 1.

In at least one embodiment, the identifier of the terminal device is one of a 5G-GUTI, a 5G-S-TMSI, or a 5G-TMSI.

In at least one embodiment, the first transmission is periodic transmission, the first transmission includes a plurality of transmission occasions, and the first transmission occasion is one of the plurality of transmission occasions. The first indication information is used to determine a first subset, the first subset is a subset of a set of the plurality of transmission occasions, and a transmission occasion in the first subset is valid for the terminal device. The first transmission occasion does not belong to the first subset.

According to a third aspect, a communication apparatus is provided. The apparatus includes a transceiver module and a processing module.

The transceiver module is configured to receive first indication information, where the first indication information indicates that a priority of first transmission on a first transmission occasion is lower than a priority of second transmission. The first transmission is an SSB or a PRACH on a first frequency domain resource. The second transmission is transmission on a second frequency domain resource. A transmission direction of the first transmission is different from a transmission direction of the second transmission. The first transmission occasion overlaps with a time domain resource of the second transmission. The processing module is configured to determine, based on the first indication information, to perform the second transmission on the second frequency domain resource. The transceiver module is further configured to perform the second transmission on the second frequency domain resource. Optionally, the PRACH is a contention-free PRACH, for example, PRACH transmission triggered by a network device by using a PDCCH order.

In a design, the first transmission is the SSB, and the second transmission is one of a PRACH, a PUSCH, a PUCCH, or an SRS.

In a design, the first transmission is the PRACH, and the second transmission is one of a PDCCH, a PDSCH, or a CSI-RS. Optionally, the PRACH is a contention-based PRACH, for example, PRACH transmission selected by a terminal during initial access.

In a design, the first indication information indicates, by indicating that the first transmission fails or the first transmission occasion fails, that the priority of the first transmission on the first transmission occasion is lower than the priority of the second transmission.

In a design, the first transmission is periodic transmission, the first transmission includes a plurality of transmission occasions, and the first transmission occasion is one of the plurality of transmission occasions. The first indication information includes grouping information of the first transmission, and is used to group the plurality of transmission occasions into M transmission occasion groups. M is an integer greater than or equal to 2. The first transmission occasion does not belong to a first group, and the first group is a group that is associated with a terminal device and that is in the M transmission occasion groups.

In a design, the grouping information of the first transmission includes a correspondence between an identifier of the terminal device and the M transmission occasion groups.

In a design, the first indication information is carried in a SIB 1.

In a design, the identifier of the terminal device is one of a 5G-GUTI, a 5G-S-TMSI, or a 5G-TMSI.

In a design, the first transmission is periodic transmission, the first transmission includes a plurality of transmission occasions, and the first transmission occasion is one of the plurality of transmission occasions. The first indication information is used to determine a first subset, the first subset is a subset of a set of the plurality of transmission occasions, and a transmission occasion in the first subset is valid for the terminal device. The first transmission occasion does not belong to the first subset.

According to a fourth aspect, a communication apparatus is provided. The apparatus includes a transceiver module and a processing module.

The processing module is configured to generate first indication information, where the first indication information indicates that a priority of first transmission on a first transmission occasion is lower than a priority of second transmission. The first transmission is an SSB or a PRACH on a first frequency domain resource. The second transmission is transmission on a second frequency domain resource. A transmission direction of the first transmission is different from a transmission direction of the second transmission. The first transmission occasion overlaps with a time domain resource of the second transmission. The transceiver module is configured to send the first indication information. The transceiver module is further configured to perform the second transmission on the second frequency domain resource.

In a design, the first transmission is the SSB, and the second transmission is one of a PRACH, a PUSCH, a PUCCH, or an SRS. Optionally, the PRACH is a contention-free PRACH, for example, PRACH transmission triggered by a network device by using a PDCCH order.

In a design, the first transmission is the PRACH, and the second transmission is one of a PDCCH, a PDSCH, or a CSI-RS. Optionally, the PRACH is a contention-based PRACH, for example, PRACH transmission selected by a terminal during initial access.

In a design, the first indication information indicates, by indicating that the first transmission fails or the first transmission occasion fails, that the priority of the first transmission on the first transmission occasion is lower than the priority of the second transmission.

In a design, the first transmission is periodic transmission, the first transmission includes a plurality of transmission occasions, and the first transmission occasion is one of the plurality of transmission occasions. The first indication information includes grouping information of the first transmission, and is used to group the plurality of transmission occasions into M transmission occasion groups. M is an integer greater than or equal to 2. The first transmission occasion does not belong to a first group, and the first group is a group that is associated with a terminal device and that is in the M transmission occasion groups.

In a design, the grouping information of the first transmission includes a correspondence between an identifier of the terminal device and the M transmission occasion groups.

In a design, the first indication information is carried in a SIB 1.

In a design, the identifier of the terminal device is one of a 5G-GUTI, a 5G-S-TMSI, or a 5G-TMSI.

In a design, the first transmission is periodic transmission, the first transmission includes a plurality of transmission occasions, and the first transmission occasion is one of the plurality of transmission occasions. The first indication information is used to determine a first subset, the first subset is a subset of a set of the plurality of transmission occasions, and a transmission occasion in the first subset is valid for the terminal device. The first transmission occasion does not belong to the first subset.

According to a fifth aspect, a communication apparatus is provided. The apparatus includes a processor. The processor is coupled to a memory. The memory is configured to store a computer program or instructions. The processor is configured to execute the computer program or the instructions, to perform the implementations in the first aspect and/or the second aspect. The memory is located inside or outside the apparatus. There are one or more processors.

According to a sixth aspect, at least one embodiment provides a communication apparatus, including a processor and an interface circuit. The interface circuit is configured to communicate with another apparatus. The processor is configured to perform the implementations in the first aspect and/or the second aspect.

According to a seventh aspect, a communication apparatus is provided. The apparatus includes a logic circuit and an input/output interface.

In an example, the input/output interface is configured to input first indication information. The first indication information indicates that a priority of first transmission on a first transmission occasion is lower than a priority of second transmission. The first transmission is an SSB or a PRACH on a first frequency domain resource. The second transmission is transmission on a second frequency domain resource. A transmission direction of the first transmission is different from a transmission direction of the second transmission. The first transmission occasion overlaps with a time domain resource of the second transmission. The input/output interface is further configured to perform the second transmission on the second frequency domain resource.

In another example, the logic circuit is configured to generate first indication information. The first indication information indicates that a priority of first transmission on a first transmission occasion is lower than a priority of second transmission. The first transmission is an SSB or a PRACH on a first frequency domain resource. The second transmission is transmission on a second frequency domain resource. A transmission direction of the first transmission is different from a transmission direction of the second transmission. The first transmission occasion overlaps with a time domain resource of the second transmission. The input/output interface is configured to output the first indication information.

According to an eighth aspect, at least one embodiment provides a communication system, including a terminal device configured to perform the implementations in the first aspect and a network device configured to perform the implementations in the second aspect.

According to a ninth aspect, at least one embodiment further provides a chip system, including a processor, configured to perform the implementations in the first aspect and/or the second aspect.

According to a tenth aspect, at least one embodiment further provides a computer program product, including computer-executable instructions. In response to the computer-executable instructions being run on a computer, the implementations in the first aspect and/or the second aspect are performed.

According to an eleventh aspect, at least one embodiment further provides a computer-readable storage medium. The computer-readable storage medium stores a computer program or instructions. In response to the instructions being run on a computer, the implementations in the first aspect and/or the second aspect are performed.

In addition, for beneficial effects of the second aspect to the eleventh aspect, refer to the beneficial effects shown in the first aspect.

BRIEF DESCRIPTION OF DRAWINGS

FIG. 1 is a schematic diagram of a cell common TDD frame structure;

FIG. 2 is a schematic diagram of an architecture of a communication system according to at least one embodiment;

FIG. 3 is a schematic diagram of a complementary frame structure;

DESCRIPTION OF EMBODIMENTS

Figure 4:
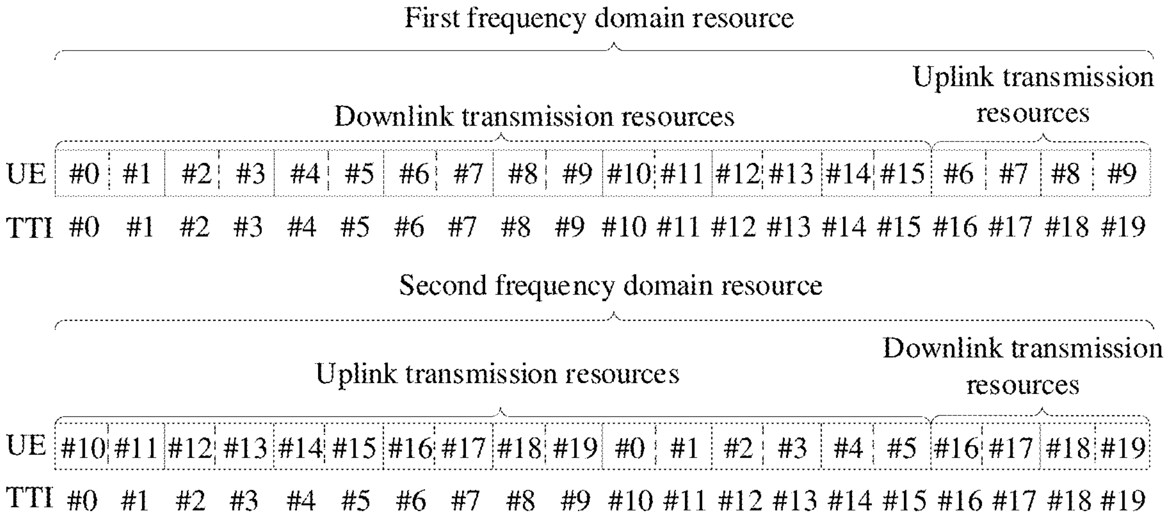
FIG. 4 is a schematic diagram of data transmission in a URLLC scenario.

For ease of understanding of the technical solutions provided in embodiments described herein, the following explains and describes terms involved in at least one embodiment.

(1) Frequency band is defined by the International Telecommunication Union (ITU) and is generally named as nxx. For example, a band n78 corresponds to a frequency band of 500 Mhz from 3.3 GHz to 3.8 GHz, and is specified that the band n78 only follows a time division duplex (TDD) mode.

(2) Component carrier (CC): A basic unit for an operator to deploy a spectrum or a frequency domain resource. Generally, one frequency band includes a plurality of CCs. One CC corresponds to a spectrum position in frequency domain, and includes a start position and a bandwidth, for example, 100 MHz, 80 MHz, 40 MHz, 20 MHz, 10 MHz and 5 MHz, and two sides generally include guard bands.

In the current long term evolution (LTE) technology and NR, a frame structure is configured in a unit of a CC. In other words, in a case in which a dynamic TDD frame structure is not considered, a TDD frame structure in one CC remains unchanged, and TDD frame structures of different CCs are different.

(3) Bandwidth part (BWP): One CC includes a plurality of BWPs. Different BWPs support different subcarrier spacings, to match different services. The plurality of BWPs share a center frequency but have different bandwidths, so that a terminal works on different bandwidths as used. This saves energy and power. Different BWPs have different bandwidths, so that a plurality of terminals with capabilities select BWPs based on the capabilities of the terminals, to ensure more flexible resource allocation.

Currently, no guard band is reserved on two sides of a BWP. In response to subcarrier spacings (SCSs) of two BWPs being different, how to avoid interference is determined by a base station. One BWP has one SCS. In other words, the SCS is configured in a unit of a BWP. In frequency domain, the BWP corresponds to a spectrum position on a CC. A start position of the BWP is relative to a start position of the CC, and a bandwidth is generally represented by a quantity of resource blocks (RBs).

(4) Subband: One BWP includes a plurality of RBs, and generally exceeds a width of coherence bandwidth of a channel Therefore, a concept of a subband is generally introduced during real data scheduling, transmission, and channel sounding. One subband includes one or more RBs. For example, during channel sounding, an assumption is made that channels on one subband are the same. During scheduling, an assumption is able to be made that precoding matrices on one subband are the same. A subband is sometimes referred to as a precoding RB group. In at least one embodiment, a subband represents a continuous spectrum.

(5) RB and subcarrier (SC): One RB includes 12 consecutive subcarriers SCs. One SC is the smallest frequency domain unit in the LTE system and the NR system and carries one modulation symbol.

The following describes a TTD frame structure configuration method In at least one embodiment.

NR Time Domain Structure

A unit of a time domain transmission resource in NR is a frame, a half-frame, a subframe, a slot, or an orthogonal frequency division multiplexing (OFDM) symbol. A length of a frame is fixed at 10 ms, a length of a half-frame is fixed at 5 ms, and a length of a subframe is fixed at 1 ms. A length of a slot and a length of a symbol are related to a subcarrier spacing. For a normal cyclic prefix, one slot includes 14 symbols. For an extended cyclic prefix, one slot includes 12 symbols. Assuming that a subcarrier spacing is SCS=$2^{\mu}\times 15$ KHz, one subframe includes $2^{\mu}$ slots, where $\mu$ is an SCS index, and a value of $\mu$ is 0, 1, 2, 3, . . . , or the like.

TDD Frame Structure

A basis of a TDD frame structure in NR is a transmission direction, and the smallest unit for determining is an OFDM symbol. For a TDD carrier, a transmission direction on a symbol is downlink D, uplink U, or flexible F. A flexible symbol indicates that downlink transmission is performed on the symbol, or uplink transmission is performed on the symbol, and is used for uplink-downlink switching. A frame structure is generally represented in a unit of a slot or a symbol. For example, aD:bS:cU represents that a TDD uplink-downlink switching periodicity is a+b+c slots, the first a slots are downlink (DL) slots, the middle b slots are flexible slots, which are also referred to as special slots, and the last c slots are uplink (UL) slots. The foregoing a, b, and c are positive integers. A flexible slot is represented as xD:yF:zU, representing that in the slot, the first x symbols are downlink symbols, the middle y symbols are flexible symbols, and the last z symbols are uplink symbols. The foregoing x, y, and z are positive integers.

Cell common TDD frame structure configuration: an indication is given by higher layer signaling tdd-UL-DL-ConfigurationCommon, where the signaling is carried in a system message or cell-specific configuration information, and includes one subcarrier spacing and one pattern. The pattern indicates one periodicity P, in a unit of ms. Both the periodicity and the configured subcarrier spacing are used to determine a quantity of slots in the periodicity. The pattern further indicates a quantity of DL slots d_slot, a quantity of DL symbols d_sym, a quantity of UL slots u_slot, and a quantity of UL symbols u_sym.

Refer to FIG. 1. SCS=30 kHz, P=5 ms, and symbols in the first d_slot=4 slots and d_sym=3 symbols in a subsequent slot are DL symbols, represented by D. Symbols in the last u_slot=2 slots and u_sym=7 symbols in a previous slot of the two slots are UL symbols, represented by U. All symbols that are not indicated in the middle are flexible symbols f_slot, represented by X. A flexible symbol is in a plurality of slots.

In some embodiments, the tdd-UL-DL-ConfigurationCommon indicates two patterns, the two patterns respectively indicate two frame structures, lengths of the two patterns are P1 and P2, and a total frame structure is a series connection of the frame structures shown in FIG. 1.

UE-specific TDD frame structure configuration: An indication is given by higher layer signaling tdd-UL-DL-ConfigurationDedicated. This signaling is a supplementary solution to the foregoing frame structure indicated by the tdd-UL-DL-ConfigurationCommon.

Assuming that a periodicity of the frame structure indicated by the tdd-UL-DL-ConfigurationCommon includes N slots, the tdd-UL-DL-ConfigurationDedicated includes a group of TDD-UL-DL-SlotConfig. Each TDD-UL-DL-SlotConfig is used to configure a frame structure of one of the N slots, and indicates that the frame structure is downlink-only or uplink-only, or indicate a quantity of downlink symbols and a quantity of uplink symbols. The downlink symbol is located before the uplink symbol in time domain.

The tdd-UL-DL-ConfigurationDedicated only configures a communication direction of a flexible symbol indicated in tdd-UL-DL-ConfigurationCommon.

Downlink control information (DCI) for dynamically indicating a TDD frame structure: The terminal is configured to detect a DCI format 2_0, and the DCI format indicates a TDD frame structure on one group of CCs. Specifically, for one CC, the DCI only modifies a communication direction of a symbol in a flexible slot after the foregoing frame structure is configured.

FIG. 2 a schematic diagram of an architecture of a communication system 1000 used in at least one embodiment. As shown in FIG. 2, the communication system includes a radio access network 100 and a core network 200. Optionally, the communication system 1000 further includes an internet 300. The radio access network 100 includes at least one radio access network device (for example, 110*a* and 110*b* in FIG. 2), and further includes at least one terminal (for example, 120*a* to 120*j* in FIG. 2). The terminal is connected to the radio access network device in a wireless manner, and the radio access network device is connected to the core network device in a wireless or wired manner. A core network device and a radio access network device are different independent physical devices, or functions of the core network device and logical functions of the radio access network device is integrated into one physical device, or some functions of the core network device and some functions of the radio access network device are integrated into one physical device. Terminals are connected to each other and radio access network devices are connected to each other in a wired or wireless manner. FIG. 2 is merely a schematic diagram, and the communication system further includes another network device, for example, further includes a wireless relay device and a wireless backhaul device that are not drawn in FIG. 2.

The radio access network device is also referred to as a network device, and is a base station, an evolved NodeB (eNodeB), a transmission reception point (TRP), a next generation NodeB (next generation NodeB, gNB) in a fifth generation (5G) mobile communication system, a next generation NodeB in a sixth generation (6G) mobile communication system, a base station in a future mobile communication system, an access node in a Wi-Fi system, or the like, or is a module or unit that completes some functions of the base station, for example, is a central unit (CU), or is a distributed unit (DU). The CU completes functions of a radio resource control protocol and a packet data convergence protocol (PDCP) of the base station, and further completes a function of a service data adaptation protocol (SDAP). The DU completes functions of a radio link control layer and a medium access control (MAC) layer of the base station, and further completes functions of some or all physical layers. For specific descriptions of the foregoing protocol layers, refer to related technical specifications of a 3rd generation partnership project (3GPP). The radio access network device is a macro base station (for example, 110*a* in FIG. 2), or is a micro base station or an indoor base station (for example, 110b in FIG. 2), or is a relay node or a donor node. A specific technology and a specific device form that are used by the radio access network device are not limited In at least one embodiment. For ease of description, the following uses an example in which a base station is used as a radio access network device for description.

The terminal is also referred to as a terminal device, user equipment (UE), a mobile station, a mobile terminal, or the like. The terminal is widely used in various scenarios such as device-to-device (D2D), vehicle-to-everything (V2X) communication, machine-type communication (MTC), an internet of things (IoT), virtual reality, augmented reality, industrial control, self-driving, telemedicine, smart grid, smart furniture, smart office, smart wear, smart transportation, and smart city. The terminal is a mobile phone, a tablet computer, a computer having a wireless transceiver function, a wearable device, a vehicle, an unmanned aerial vehicle, a helicopter, an airplane, a ship, a robot, a robot arm, a smart home device, or the like. A specific technology and a specific device form that are used by the terminal are not limited In at least one embodiment.

The base station and the terminal are located at a fixed position, or is mobile. The base station and the terminal are deployed on land, including an indoor or outdoor device, a handheld device, or a vehicle-mounted device, is deployed on water, or are deployed on an airplane, a balloon, or a satellite in air. Application scenarios of the base station and the terminal device are not limited In at least one embodiment.

Roles of the base station and the terminal are relative. For example, a helicopter or an unmanned aerial vehicle 120*i* in FIG. 2 is configured as a mobile base station. For a terminal 120*j* that accesses the radio access network 100 by using a 120*i*, the terminal 120*i* is a base station. However, for a base station 110*a*, the terminal 120*i* is a terminal, that is, the 110*a* and the 120*i* communicate with each other by using a wireless air interface protocol. Certainly, the 110*a* and the 120*i* alternatively communicate with each other by using an interface protocol between base stations. In this case, for the 110*a*, the 120*i* is also a base station. Therefore, both the base station and the terminal are collectively referred to as communication apparatuses. The 110*a* and the 110*b* in FIG. 2 are referred to as communication apparatuses having a function of the base station, and the 120*a* to 120*j* in FIG. 2 is referred to as communication apparatuses having a function of the terminal.

Communication is performed between a base station and a terminal, between a base stations, and between terminals by using a licensed spectrum, by using an unlicensed spectrum, by simultaneously using a licensed spectrum and an unlicensed spectrum, by using a spectrum below 6 gigahertz (GHz), by using a spectrum above 6 GHz, or by simultaneously using a spectrum below 6 GHz and a spectrum above 6 GHz. A spectrum resource used in wireless communication is not limited In at least one embodiment.

In at least one embodiment, a function of the base station is alternatively performed by a module (for example, a chip) in the base station, or is performed by a control subsystem including the function of the base station. The control subsystem including the function of the base station is a control center in the foregoing application scenarios such as smart grid, industrial control, smart transportation, and smart city. The function of the terminal is alternatively performed by a module (for example, a chip or a modem) in the terminal, or is performed by an apparatus including a function of the terminal.

In at least one embodiment, the base station sends a downlink signal or downlink information to the terminal, where the downlink information is carried in a downlink channel. The terminal sends an uplink signal or uplink information to the base station, where the uplink information is carried in an uplink channel. To communicate with the base station, the terminal establishes a wireless connection to a cell controlled by the base station. The cell that establishes a wireless connection to the terminal is referred to as a serving cell of the terminal. In response to communicating with the serving cell, the terminal is further interfered by a signal from a neighboring cell.

In at least one embodiment, a time domain symbol is an OFDM symbol, or is a Discrete Fourier Transform-spread-OFDM (DFT-s-OFDM) symbol. Unless otherwise specified, symbols In at least one embodiment are all time domain symbols.

In at least one embodiment, a PDSCH, a PDCCH, a PUSCH, and a PUCCH are merely used as examples of a downlink data channel, a downlink control channel, an uplink control channel, and an uplink data channel In different systems and different scenarios, a data channel and a control channel have different names, and this is not limited In at least one embodiment. In at least one embodiment, a signal includes a data channel, a control channel, and a reference signal. Signal transmission is uplink transmission, that is, the terminal sends the signal to the base station, or is downlink transmission, that is, the base station sends the signal to the terminal. In response to the transmission being used as a verb, the transmission is interchanged with the sending/receiving.

A traditional macro base station is deployed by using either frequency division duplex (FDD) or TDD. In a TDD deployment scenario, in response to a downlink data packet reaching an uplink slot, downlink data packet waits for several slots before a downlink transmission resource is available. A waiting latency is excessively long. Similarly, in response to the terminal failing to decode a downlink data after the downlink data is transmitted, the terminal waits for several slots to reach an uplink slot to feed back a positive acknowledgment (ACK) or a negative acknowledgment (NACK) indicating whether the downlink data is correctly decoded, and then the base station is triggered to retransmit the data. Retransmission waiting time is excessively long.

Due to the foregoing problems, existing TDD cannot meet a low-latency usage of a URLLC service.

To resolve the foregoing problems, a design solution of a complementary frame structure is proposed. Refer to FIG. 3. Another frequency domain resource whose frame structure is 3U:1S:1D is introduced based on an existing frequency domain resource whose frame structure is 3D:1S:1U, to form complementation. In this way, a downlink resource and an uplink resource are available at any moment. A frequency domain resource is dynamically selected, so that no extra waiting latency is ensured. In addition, because each frequency domain resource is of a TDD frame structure, a downlink transmission channel is estimated by using an uplink reference signal. This improves spectral efficiency.

However, in response to different frequency domain resources of the two frame structures are located in one frequency band, the terminal usually does not have a capability of simultaneously receiving downlink data and sending uplink data. Therefore, a sending or receiving behavior of the terminal is to be specified.

In NRCA, terminal half-duplex is proposed. To be specific, in response to a terminal being configured with a plurality of CCs, in response to TDD frame structures of these CCs being different, for example, some symbols on a carrier 1 (CC #1) are downlink symbols, and some symbols at a corresponding time domain position on a carrier 2 (CC #2) are uplink symbols, behavior of the terminal in this scenario is to be specified in a protocol. Currently, the protocol defines half-duplex-behavior of the terminal as follows:

The terminal is configured with a group of CCs, is not configured to detect a DCI format 2_0, that is, the terminal does not support dynamically modifying a slot format by using the DCI, and is configured with half-duplex-behavior='enable', that is, the terminal performs a half-duplex operation. The protocol specifies that the terminal has a capability of following the following half-duplex collision resolution rules:

Rule #1: SSB protection principle. An SSB includes a synchronization signal (SS) and a physical broadcast channel (PBCH). No uplink transmission is performed on a transmission symbol of an SSB indicated by a system message or cell common configuration information on any CC in the foregoing one group of CCs. In response to a PUSCH, a PUCCH, and a PRACH conflicting with an SSB symbol, transmission of the PUSCH, the PUCCH, and the PRACH are canceled. In response to an SRS conflicting with the SSB, only SRS transmission on a conflict symbol is canceled.

Rule #2: PRACH protection principle. For any valid PRACH occasion, in response to downlink transmission (except the SSB, such as a PDCCH, a PDSCH, or a CSI-RS) overlapping with the valid PRACH occasion, or overlaps with $N_{gap}$ OFDM symbols before the valid PRACH occasion, the terminal does not receive the downlink transmission. That a PRACH occasion is valid means: (1) an OFDM symbol in which the PRACH occasion is located is an uplink symbol, (2) the PRACH occasion is not before an SSB occasion in a slot in which the PRACH occasion is located, and (3) no SSB transmission is performed on $N_{gap}$ OFDM symbols before the PRACH occasion, where a parameter $N_{gap}$ is a value predefined in a protocol or indicated by a base station.

Rule #3: Common search space (CSS) #0 protection principle. At a position in CSS #0 indicated in a master information block (MIB), there is no expectation that any cell configures an overlapping symbol as an uplink symbol. The terminal detects and schedules a SIB 1 at the position in CSS #0.

The foregoing plurality of rules do not consider that URLLC transmission and eMBB transmission have different urgency and priorities, and therefore are not friendly to an RLLCC application. Specifically, the rule #1 to the rule #3 is simply summarized as cell-specific signal protection rules. Because the SSB, the PRACH, and the CSS #0 are all cell-specific, that is, are the same for all terminals, and are configured for initial access, the base station cannot choose not to send the signals, or the base station cannot stop sending the signals for a long time. Therefore, priorities of these signals are high. In response to there being reverse transmission conflicting with the signals, the reverse transmission is to be discarded.

For some typical URLLC applications, these rules have a large problem. For example, in a future factory automation application, data arrival of each user is periodic and the periodicity is fixed. For example, a data packet arrives at an interval of 4 ms or 6 ms. To maximize resource use efficiency, data packets of a terminal arrive and are evenly distributed in the future factory, so that all resources in a service periodicity are fully used.

Refer to FIG. 4. A service arrival periodicity is 4 ms. In a 30 kHz subcarrier spacing and a 7-OFDM symbol (OS) transmission time interval (TTI), one periodicity includes 16 TTIs, and downlink data of 16 groups of terminals arrives at each TTI. Specifically, in FIG. 4, downlink transmission resources of UE #0 to UE #15 are at a TTI #0 to a TTI #15 on a first frequency domain resource, and downlink transmission resources of UE #16 to UE #19 are at a TTI #16 to a TTI #19 on a second frequency domain resource. Uplink transmission resources of the UE #0 to the UE #5 are at a TTI #10 to a TTI #15 on the second frequency domain resource, uplink transmission resources of the UE #6 to the UE #9 are at a TTI #16 to a TTI #19 on the first frequency domain resource, and uplink transmission resources of the UE #10 to the UE #19 are at a TTI #0 to a TTI #9 on the second frequency domain resource. Because the terminal does not support sending data on one CC while receiving data on another CC, arrival of uplink data and arrival of downlink data of the terminal has an offset, and are arranged at different TTIs. However, to maximize resource use efficiency, downlink transmission of a terminal or a UE group #n in one TTI definitely corresponds to uplink transmission of another terminal or UE group #m.

Figure 5:
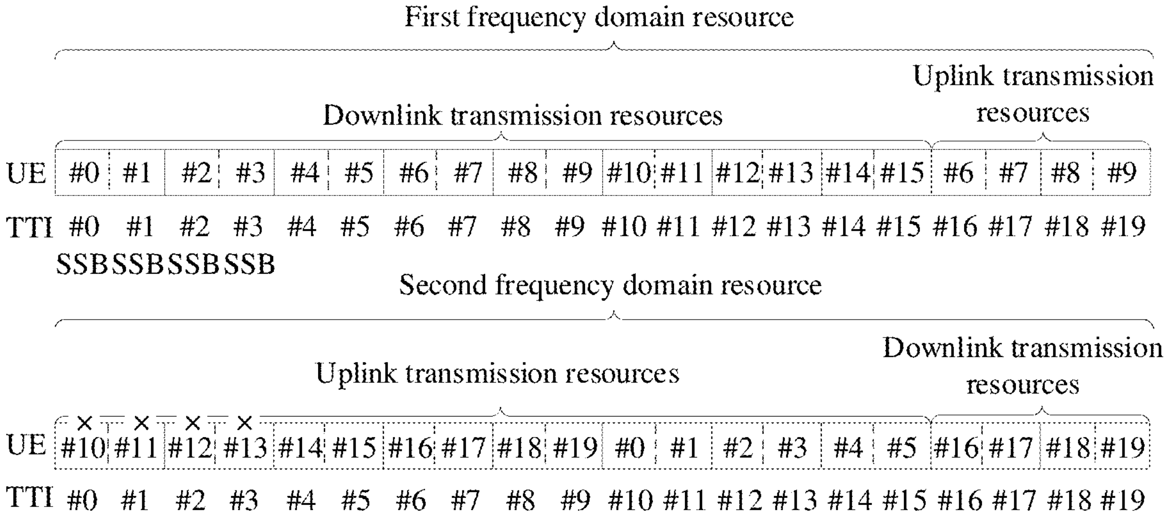
FIG. 5 is a schematic diagram of data transmission according to an SSB protection rule.

In this case, in consideration of the foregoing cell-specific signal protection rules, some resources cannot be used for data transmission of the terminal. An SSB is used as an example. Refer to FIG. 5, in response to SSB transmission existing at TTIs #0, #1, #2, and #3, an uplink resource on another CC in a corresponding TTI cannot be used for uplink transmission of any terminal. In other words, UEs or UE groups #10, #11, #12, and #13 in the figure are canceled due to a conflict with the SSB. In addition, considering that the SSB is periodic transmission, and service arrival is also periodic transmission, in response to two periodicities not being aligned, data of each group of terminals encounter the SSB at a moment. For example, an SSB periodicity is 20 ms, and a service periodicity is 6 ms. To be specific, 24 groups of terminals encounter the SSB at a moment. In this case, a least common multiple is 60 ms, data of each group of terminals arrives 10 times within 60 ms, and data of 12 groups of terminals conflicts with the SSB at some moments.

Based on the foregoing problems, at least one embodiment provides a communication method, to agree on behavior of a terminal in response to an uplink-downlink conflict occurring between cell-specific transmission and UE-specific transmission of a terminal. The following separately describes cell-specific transmission and UE-specific transmission.

I. The cell-specific transmission is transmission of a cell-specific signal. The cell-specific signal is a signal that has same transmission configuration for all terminals. Optionally, the cell-specific signal is a signal that is to be received or sent in a process in which the terminal accesses a cell and changes from an idle state to a connected state. In at least one embodiment, the cell-specific signal includes a downlink common signal and an uplink common signal.

1. Downlink common signal: A downlink common signal used for initial access, and used to identify a cell, complete downlink timing synchronization, and obtain basic configuration information of a cell, for example, a PDCCH on the SSB and in the CSS #0 (also referred to as Type0-PDCCH CSS) in NR.

Alternatively, the downlink common signal functionally includes a downlink synchronization signal, a downlink broadcast channel carrying a MIB, a PDSCH carrying a SIB 1, and a PDCCH in the CSS #0. DCI carried in the PDCCH indicates the PDSCH carrying the SIB 1. The following separately describes different downlink common signals.

(1) SSB includes a synchronization signal SS and a physical broadcast channel PBCH. The synchronization signal includes a primary synchronization signal (PSS) and a secondary synchronization signal (SSS). The PBCH carries a MIB for accessing a cell. The two are jointly used to obtain a cell identity (ID), downlink timing synchronization, and a most important system message, for example, obtain a time domain position and a frequency domain position at which a subsequent SIB 1 is located.

(2) SIB 1: After detecting the SSB, the terminal completes downlink timing synchronization, and then determine, based on a time domain position and a frequency domain position of the current SSB and an SSB index, a time domain position and a frequency domain position of a PDCCH configured to schedule the SIB 1. Specifically, a frequency domain position of the PDCCH is referred to as a control resource set (CORESET) #0 in NR, and a time domain position is referred to as CSS #0 or Type0-PDCCH CSS. A correspondence between a time domain position and a frequency domain position of the SSB, the CORESET #0, and the CSS #0 is not described herein in detail. One SSB index corresponds to one transmission position of the CSS #0.

A time domain position at which the terminal receives the PDCCH is configured by using search space (SS). Generally, the terminal is configured with CSS and some UE-specific search space (USS). The CSS includes Type0-PDCCH CSS, Type0A-PDCCH CSS, Type1-PDCCH CSS, Type2-PDCCH CSS, and Type3-PDCCH CSS. In the CSS, the Type0-PDCCH CSS is a PDCCH used by a user to receive and schedule a SIB 1, and is generally used for initial access. Other CSS is common, but is not used for initial access. The USS is separately configured for each terminal, that is, configured for each UE. Different terminals are staggered through time division multiplexing (TDM).

2. Uplink common signal: information used by the terminal to perform random access, and used to complete uplink timing synchronization between the terminal and a cell and complete a function of registering the terminal in the cell, for example, a PRACH in NR.

(1) PRACH includes PRACH transmission in 4-step RACH and PRACH transmission in two-step RACH (2-Step RACH). In at least one embodiment, the PRACH is the first transmission in the 4-step RACH, namely, a message 1 (Msg1), or is the first transmission in the 2-step RACH, namely, a message A (MsgA).

II. The UE-specific transmission is transmission of a UE-specific signal. The UE-specific signal means that the signal is sent to a specific terminal rather than to all terminals in a cell, and the UE-specific transmission includes downlink transmission and uplink transmission.

1. Downlink transmission includes PDCCH transmission, PDSCH transmission, and downlink reference signal transmission, for example, CSI-RS transmission, and further includes UE-specific SSB transmission.

(1) PDCCH transmission includes PDCCH transmission in the USS. Alternatively, the PDCCH transmission further includes PDCCH transmission in other CSS other than the CSS #0, for example, PDCCH transmission in the Type0A-PDCCH CSS, Type1-PDCCH CSS and Type2-PDCCH CSS, and PDCCH transmission in the Type3-PDCCH CSS.

(2) PDSCH transmission includes at least PDSCH transmission scheduled by using DCI carried by a PDCCH in the USS, and semi-persistent scheduling PDSCH transmission configured by using radio resource control (RRC) signaling, for example, semi-persistent scheduling (SPS) PDSCH transmission. Alternatively, the PDSCH transmission further includes PDSCH transmission scheduled by a PDCCH on another CSS other than the CSS #0, for example, PDSCH transmission scheduled by a PDCCH on the Type0A-PDCCH CSS, Type1-PDCCH CSS and Type2-PDCCH CSS.

(3) CSI-RS transmission includes periodic (P) CSI-RS transmission configured by using RRC signaling, semi-persistent (SP) CSI-RS transmission activated by using a medium access control (MAC) control element (CE) or DCI, and aperiodic (A) CSI-RS transmission dynamically activated by using DCI.

(4) UE-specific SSB transmission: SSB transmission configured by using UE-specific signaling, for example, RRC signaling.

2. Uplink transmission includes PUSCH transmission, PUCCH transmission, and SRS transmission, and further includes UE-specific PRACH transmission.

(1) PUSCH transmission at least includes PUSCH transmission scheduled by DCI on a PDCCH in the USS and configuration grant (CG) PUSCH transmission configured by using RRC signaling. Alternatively, the PUSCH transmission further includes PUSCH transmission scheduled by a random access response (RAR) UL grant.

(2) PUCCH transmission includes PUCCH transmission carrying hybrid automatic repeat request (HARQ)-ACK transmission, scheduling request (SR) transmission, or beam failure recovery (BFR) transmission and CSI. The PUCCH transmission carrying the HARQ-ACK includes HARQ-ACK transmission of the SPS PDSCH and PDSCH transmission scheduled by the DCI, and further includes HARQ-ACK transmission of the PDSCH scheduled by the PDCCH on another CSS other than the CSS #0. PUCCH transmission carrying an SR/BFR is periodic PUCCH transmission configured by using RRC signaling, and in response to a higher layer triggering a physical layer to send an SR or a BFR on a corresponding PUCCH resource, the PUCCH transmission is actually performed; otherwise, the PUCCH transmission is skipped. The PUCCH transmission carrying CSI includes periodic CSI transmission configured by using RRC signaling and semi-periodic CSI transmission activated by a MAC CE.

(3) SRS transmission includes periodic SRS (P-SRS) transmission configured by using RRC signaling, semi-persistent SRS (SP-SRS) transmission activated by using a MAC CE, and aperiodic SRS (A-SRS) transmission activated by using DCI.

(4) UE-specific PRACH transmission includes contention-free PRACH transmission, for example, PRACH transmission triggered by a PDCCH order.

Figure 6:
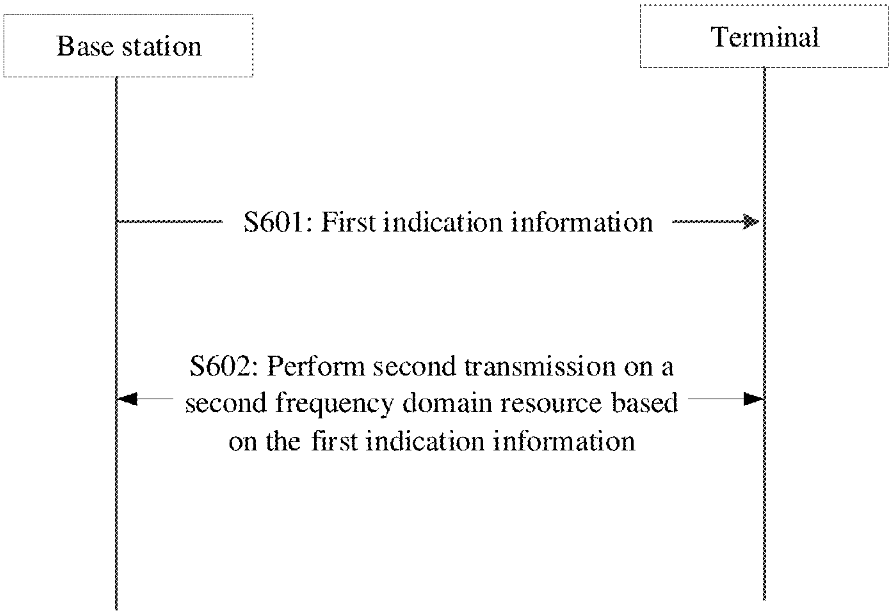
FIG. 6 is a schematic flowchart of a communication method according to at least one embodiment.

FIG. 6 is a schematic flowchart of a communication method according to at least one embodiment. The method includes the following operations.

S601: A base station sends first indication information, and a corresponding terminal receives the first indication information.

The first indication information indicates that a priority of first transmission on the first transmission occasion is lower than a priority of second transmission.

In at least one embodiment, the first transmission is cell-specific transmission on a first frequency domain resource, and the second transmission is UE-specific transmission on a second frequency domain resource. Specifically, the first transmission is cell-specific transmission during initial access. The first transmission is cell-specific downlink transmission, and the second transmission is UE-specific uplink transmission. Alternatively, the first transmission is cell-specific uplink transmission, and the second transmission is UE-specific downlink transmission.

For example, the first transmission is an SSB, and the second transmission is one of a PRACH, a PUSCH, a PUCCH, or an SRS. Optionally, that the first transmission is an SSB means that the first transmission is an SSB configured in a SIB 1, and that the second transmission is a PRACH means that the second transmission is a contention-free PRACH.

For another example, the first transmission is a PRACH, and the second transmission is one of a PDCCH, a PDSCH, or a CSI-RS. Optionally, that the first transmission is a PRACH means that the first transmission is a contention-based PRACH.

In at least one embodiment, both the first transmission and the second transmission are the cell-specific transmission. For example, the first transmission is an SSB, and the second transmission is a PRACH. Optionally, the PRACH is a contention-based PRACH.

In an example, the first transmission occasion overlaps with a time domain resource of the second transmission. The foregoing overlapping is generalized overlapping, and corresponds to any one of the following cases: (1) A time domain OFDM symbol occupied by the first transmission occasion partially or completely overlaps with a time domain OFDM symbol occupied by the second transmission. (2) An OFDM symbol occupied by the first transmission occasion does not overlap with an OFDM symbol occupied by the second transmission, but the OFDM symbol occupied by the first transmission occasion overlaps with N1 OFDM symbols before the second transmission, or the OFDM symbol occupied by the first transmission occasion overlaps with $N_2$ OFDM symbols after the second transmission, or M1 OFDM symbols before the first transmission occasion overlap with the OFDM symbol occupied by the second transmission, or M2 OFDM symbols after the first transmission occasion overlap with the OFDM symbol occupied by the second transmission, where N1, N2, M1, and M2 is predefined parameters or parameters indicated by the base station. (3) The first transmission occasion and the second transmission are in a slot, and an OFDM symbol occupied by the second transmission is located in time domain before an OFDM symbol occupied by the first transmission occasion.

In at least one embodiment, the first frequency domain resource and the second frequency domain resource are configured by the base station for the terminal. Specifically, the base station sends configuration information of the first frequency domain resource and configuration information of the second frequency domain resource.

The first frequency domain resource and the second frequency domain resource are two CCs on two frequency bands, or are two CCs on one frequency band, or are two BWPs on one CC, or are two subbands on one BWP.

Optionally, the first frequency domain resource and the second frequency domain resource are one frequency domain resource. For example, the first frequency domain resource and the second frequency domain resource are one BWP. Correspondingly, subsequent first transmission and second transmission is transmission that occupies different RBs on the BWP.

In at least one embodiment, the terminal does not support performing reverse transmission on the first frequency domain resource and the second frequency domain resource at the same time. For example, the terminal does not support sending a signal at the same moment on the second frequency domain resource while receiving a signal at a moment on the first frequency domain resource. Alternatively, the terminal does not support receiving a signal at the same moment on the second frequency domain resource while sending a signal at a moment on the first frequency domain resource.

Further, the base station sends configuration information of the first transmission and configuration information of the second transmission to the terminal. The configuration information of the first transmission includes a plurality of transmission occasions of the first transmission and a frequency domain resource occupied by each transmission occasion. The frequency domain resource occupied by each transmission occasion is on the first frequency domain resource. The first transmission occasion is one of the plurality of transmission occasions of the first transmission. The configuration information of the second transmission includes a time domain resource and a frequency domain resource of the second transmission, and the frequency domain resource of the second transmission is on the second frequency domain resource.

Optionally, the first transmission is periodic transmission. For example, the first transmission is the SSB, and the SSB is periodically and repeatedly transmitted. In each periodicity, there are a plurality of transmission occasions, and the SSB is sent on each transmission occasion. For another example, the first transmission is the PRACH, and the PRACH resource is periodic. In each periodicity, there are a plurality of transmission occasions, and the PRACH is sent on each transmission occasion.

S602: The terminal performs the second transmission on the second frequency domain resource based on the first indication information. Correspondingly, the base station performs the second transmission on the second frequency domain resource. In response to the second transmission being uplink transmission, the terminal sends an uplink signal to the base station on the second frequency domain resource based on the first indication information. Correspondingly, the base station receives the uplink signal from the terminal on the second frequency domain resource. In response to the second transmission being downlink transmission, the base station sends a downlink signal to the terminal on the second frequency domain resource. Correspondingly, the terminal receives the downlink signal from the base station on the second frequency domain resource based on the first indication information.

Based on the foregoing solution, the first indication information is used to indicate that the priority of the first transmission on the first transmission occasion is lower than the priority of the second transmission. Therefore, the terminal performs reverse transmission (second transmission) on a resource that overlaps with the cell-specific transmission in time domain, so that a limitation on a transmission direction of the cell-specific transmission is reduced, and resource use flexibility is increased.

Correspondingly, the terminal stops the first transmission on the first transmission occasion on the first frequency domain resource. The stopping the first transmission includes: (1) discarding/canceling the entire first transmission, that is, not performing the first transmission; and (2) discarding/canceling a part of the first transmission, for example, canceling a part of the first transmission on a symbol that overlaps with a time domain of the second transmission. Specifically, in response to the first transmission being downlink transmission, for example, the SSB, the terminal does not receive or does not expect to receive the first transmission. Correspondingly, in response to a measurement quantity being associated with the first transmission, the terminal does not update the measurement quantity. In response to the first transmission being uplink transmission, for example, the PRACH, the terminal does not send or is not allowed to send the first transmission.

In at least one embodiment, although a function of the first indication information is to indicate that the priority of the first transmission on the first transmission occasion is lower than the priority of the second transmission, the first indication information has different implementations. The following separately describes the implementations.

Case 1: The first indication information indicates that the first transmission occasion fails, or the first indication information indicates that the first transmission fails.

The first indication information is carried in RRC signaling, or is carried in a MAC CE, or is carried in DCI. The first indication information indicates that the first transmission occasion fails, that is, is used to close or disable the first transmission on the first transmission occasion. For example, the first transmission is the SSB, and the first indication information indicates that the terminal does not detect or receive SSB transmission on a first SSB occasion. For another example, the first transmission is the PRACH, and the first indication information indicates that the terminal cannot send the PRACH on a first PRACH occasion. Alternatively, the first indication information indicates that the first transmission fails, that is, is used to disable all cell-specific transmission during initial access. For example, the first indication information is used to disable all SSB transmission indicated in a SIB 1 and/or PRACH transmission configured by using RACH configuration signaling in a SIB 1.

The terminal determines to perform the second transmission on the second frequency domain resource based on the first indication information.

Optionally, the terminal further receives second indication information. The second indication information is UE-specific. For example, the second indication information is sent to the terminal by using UE-specific RRC signaling, a MAC CE, or DCI, indicates a new transmission occasion or a time domain position and a frequency domain position of new transmission for performing the first transmission. For example, after initial access, the base station indicates, to the terminal by using the UE-specific RRC signaling, a group of a new time domain position and a new frequency domain position to transmit the SSB, and the terminal detects the SSB at the new time domain position and the new frequency domain position. For another example, after initial access, the base station indicates, to the terminal by using the UE-specific RRC signaling, a group of a new time domain position and a new frequency domain position to send the PRACH, and the terminal sends a contention-based PRACH and a contention-free PRACH at the new time domain position and the new frequency domain position.

The following describes in detail the communication method provided In at least one embodiment by separately using different types of first transmission as an example.

(1) The first transmission is SSB transmission indicated in the SIB 1, for example, SSB transmission indicated by ssb-PositioninBurst.

The first indication information indicates that the SSB transmission indicated in the SIB 1 fails in an initial access process, and the terminal does not detect and measure these SSBs. Optionally, SSB measurement and reporting indicated in the SIB 1 also fail. In other words, the SSB does not participate in corresponding SSB measurement and reporting this time. The terminal performs, on the second frequency domain resource, the second transmission that overlaps with an SSB transmission occasion in time domain.

Optionally, the base station sends the second indication information to the terminal, and correspondingly, the terminal receives the second indication information. The second indication information indicates a group of UE-specific SSBs. Optionally, the UE-specific SSBs indicated by the second indication information are still transmitted on one or more SSB transmission positions in a set of SSB transmission positions predefined in a protocol, and the second indication information indicates a periodicity of the UE-specific SSB transmission and a specific transmission position of the UE-specific SSB.

(2) The first transmission is PDCCH transmission in CSS #0.

The first indication information indicates that the PDCCH transmission in the CSS #0 fails in an initial access process, and the terminal does not detect the PDCCH in the CSS #0. The terminal performs, on the second frequency domain resource, the second transmission that overlaps with the PDCCH in the CSS #0 in time domain.

Optionally, the base station configures new USS or another CSS for the terminal by using the second indication information, to receive, in a connected state, a PDCCH that schedules the SIB 1.

On the time domain resource of the CSS #0, an OFDM symbol corresponding to the second frequency domain resource is an uplink symbol or a flexible symbol.

(3) The first transmission is PRACH transmission indicated in the SIB 1, for example, PRACH transmission indicated by using RACH Configuration.

The first indication information indicates that the PRACH transmission configured in the SIB 1 fails, and the terminal cannot spontaneously send the PRACH on a PRACH resource indicated by the base station. The terminal performs the second transmission on the second frequency domain resource that overlaps with the PRACH resource in time domain, that is, receive a downlink signal.

Optionally, the base station configures a UE-specific PRACH resource for the terminal by using the second indication information.

Based on the foregoing solution, the first indication information is introduced, so that the terminal is clearly notified that cell-specific transmission during initial access fails, and after receiving the first indication information, the terminal performs reverse transmission on a symbol that overlaps with the cell-specific transmission, thereby avoiding a limitation of the cell-specific transmission on a transmission direction and increasing resource use flexibility. In addition, the second indication information is introduced, so that the cell-specific transmission is changed to the UE-specific transmission, thereby implementing TDM transmission between different terminals.

Case 2: The first indication information indicates grouping information of the first transmission.

The first transmission is periodic transmission, and includes a plurality of transmission occasions. The first indication information is used to group the plurality of transmission occasions into M transmission occasion groups, where M is an integer greater than or equal to 2. The first indication information is carried in the SIB 1, or is carried RRC signaling after initial and random access, in other words, in RRC signaling after RRC establishment.

In response to the first transmission occasion not belonging to a first group, the terminal performs, on the second frequency domain resource, the second transmission that overlaps with the first transmission occasion in time domain. The first group is a group that is associated with the terminal and that is in the M transmission occasion groups. In other words, in response to the first indication information indicating that only the first group is associated with the terminal, that is, only a transmission occasion in the first group is valid for the terminal. In response to the first transmission occasion not belonging to the first group, the first transmission occasion is invalid for the terminal. In this case, the terminal performs the second transmission on a time domain resource with which the first transmission occasion overlaps.

Optionally, the grouping information of the first transmission includes a correspondence between an identifier of the terminal and the M transmission occasion groups. The terminal determines, based on the correspondence between the identifier of the terminal and the M transmission occasion groups, whether the first transmission occasion belongs to the first group.

Optionally, the identifier of the terminal is an identifier before random access, for example, is one of a 5G-GUTI, a 5G-S-TMSI, or a 5G-TMSI. Alternatively, the identifier of the terminal is a cell-radio network temporary identifier (C-RNTI) or an identifier of another temporary terminal indicated by the base station.

For example, in response to the transmission occasions of the first transmission being grouped into M groups, and the identifier of the terminal being x, the first group associated with the terminal is the $((x \bmod M)+1)^{th}$ group. The correspondence between the identifier of the terminal and the M transmission occasion groups is merely an example, and is not intended to limit the first group associated with the terminal.

The following describes in detail the communication method provided In at least one embodiment by separately using different types of first transmission as an example.

(1) The first transmission is SSB transmission.

The first indication information indicates grouping information of SSBs indicated in the SIB 1 in an initial access process. For example, the first indication information indicates that the SSBs are grouped into M groups.

For example, the first indication information includes a quantity M of groups, an SSB periodicity corresponding to each group, and/or an SSB transmission position in the periodicity. For example, in response to M=2, a first group of SSBs and a second group of SSBs correspond to a transmission periodicity of 20 ms, the first group is located in a first half-frame in the transmission periodicity of 20 ms, and the second group is located in a second half-frame in the periodicity of 20 ms, or both the first group and the second group are located in a first half-frame in the periodicity of 20 ms, but the first group corresponds to SSB indexes #0 to #3, and the second group corresponds to SSB indexes #4 to #7.

The first indication information further includes a correspondence between an SSB group and a UE ID.

Optionally, the first indication information is carried in the SIB 1. In this case, the UE ID is one of a 5G-GUTI, a 5G-S-TMSI, or a 5G-TMSI.

Alternatively, the first indication information is carried in RRC signaling after initial and random access, in other words, in RRC signaling after RRC establishment. In this case, the UE ID is a C-RNTI or another temporary UE ID indicated by a base station.

Optionally, the first indication information is classified into first sub indication information and second sub indication information. The first sub indication information indicates grouping information of SSBs. For example, the first sub indication information includes a quantity M of groups, an SSB periodicity corresponding to each group, and/or an SSB transmission position in the periodicity. The first sub indication information is carried in the SIB 1 or the RRC signaling after RRC establishment. The second sub indication information indicates a number of an SSB group corresponding to the terminal, and the second sub indication information is carried in RRC signaling, a MAC CE, or DCI. For example, the second sub indication information is separately notified to each terminal by using UE-specific indication information.

(2) The first transmission is PDCCH transmission in CSS #0.

The first indication information is the first indication information used for the SSB transmission shown in (1). To be specific, the terminal detects the PDCCH only in CSS #0 associated with an SSB group that corresponds to the UE ID of the terminal, and does not detect the PDCCH at a position in CSS #0 of an SSB group that does not correspond to the UE ID of the terminal.

Optionally, the first indication information is different from the first indication information used for the SSB transmission shown in (1). The first indication information is carried in the SIB 1 or carried in RRC signaling after RRC establishment, indicating a quantity of groups of the CSS #0 and a transmission position of each group of the CSS #0.

For example, the first indication information includes a quantity M of groups, and a CSS #0 transmission position corresponding to each group.

The first indication information further includes a correspondence between an SSB group and a UE ID. The UE ID is one of a 5G-GUTI, a 5G-S-TMSI, a 5G-TMSI, a C-RNTI, or another temporary UE ID indicated by the base station.

Optionally, the first indication information is classified into first sub indication information and second sub indication information. The first sub indication information indicates grouping information of the CSS #0. For example, the first sub indication information includes a quantity M of groups and a CSS #0 transmission position corresponding to each group. The first sub indication information is carried in the SIB 1 or RRC signaling after RRC establishment. The second sub indication information indicates a number of a CSS #0 group corresponding to the terminal, and the second sub indication information is carried in RRC signaling, a MAC CE, or DCI. For example, the second sub indication information is separately notified to each terminal by using UE-specific indication information.

(3) The first transmission is PRACH transmission.

The first indication information indicates grouping information of PRACH transmission configured in the SIB 1. For example, indication information of a quantity M of groups is included.

For example, the first indication information includes a quantity M of groups, a PRACH periodicity corresponding to each group, and/or a PRACH transmission position in the periodicity. For example, each PRACH group corresponds to a PRACH configuration index (prach-ConfigurationIndex), and the prach-ConfigurationIndex indicates an index of each PRACH group, and is used to determine a time domain resource position of each PRACH group.

The first indication information further includes a correspondence between a PRACH group and a UE ID.

Optionally, the first indication information is carried in the SIB 1. In this case, the UE ID is an ID of the terminal before random access, for example, one of a 5G-GUTI, a 5G-S-TMSI, or a 5G-TMSI.

Alternatively, the first indication information is carried in RRC signaling after initial and random access, in other words, RRC signaling after RRC establishment. In this case, the UE ID is a C-RNTI of the terminal or another temporary UE ID indicated by the base station.

Optionally, the first indication information is classified into first sub indication information and second sub indication information. The first sub indication information indicates grouping information of the PRACHs, for example, including a quantity M of groups, a PRACH periodicity corresponding to each group, and/or a PRACH transmission position in the periodicity. The first sub indication information is carried in the SIB 1 or RRC signaling after RRC establishment. The second sub indication information indicates a number of a PRACH group corresponding to the terminal, and the second sub indication information is carried in RRC signaling, a MAC CE, or DCI. For example, the second sub indication information is separately notified to each UE by using UE-specific indication information.

Based on the foregoing case 2, the terminal determines, based on the first indication information, whether the first transmission occasion belongs to a cell-specific transmission group corresponding to the UE ID of the terminal. In response to the first transmission occasion belonging to the cell-specific transmission group corresponding to the UE ID of the terminal, the priority of the first transmission is higher than the priority of the second transmission. In other words, the terminal performs the first transmission on the first transmission occasion, and skips the second transmission. In response to the first transmission occasion not belonging to the cell-specific transmission group corresponding to the UE ID of the terminal, the priority of the first transmission is lower than the priority of the second transmission. In other words, the terminal performs the second transmission on the second frequency domain resource.

Based on the foregoing solution, the grouping information of the cell-specific transmission is introduced, so that cell-specific transmission is changed to UE-specific transmission, namely, UE group-specific transmission. This supports TDM transmission between different UEs or UE groups, avoids a scheduling limitation of cell-specific transmission on all UEs, and improves resource use efficiency.

Case 3: The first indication information indicates a first subset.

The first subset is a subset of a set of the plurality of transmission occasions of the first transmission. The base station indicates, to the terminal by using the first indication information, that the transmission occasion in the first subset is valid for the terminal.

In an example, the plurality of transmission occasions of the first transmission is grouped into a plurality of subsets, and each subset has an index. The base station indicates the index of the first subset to the terminal by using the first indication information, to indicate, to the terminal, that the first subset is valid.

In another example, the first indication information includes the plurality of transmission occasions, and these transmission occasions are considered as a first subset. The base station indicates the plurality of transmission occasions to the terminal by using the first indication information.

In response to the first transmission occasion not belonging to the first subset, the terminal performs, on the second frequency domain resource, the second transmission that overlaps with cell-specific transmission in time domain. In response to the first transmission occasion belonging to the first subset, the terminal performs the cell-specific transmission, and abandons the second transmission.

Based on the foregoing solution, the cell-specific transmission is divided into a plurality of groups, and the first indication information is used to indicate a subset of valid transmission occasions to the terminal. This supports TDM transmission between different terminals, avoids a scheduling limitation of the cell-specific transmission on all terminals, and improves resource use efficiency.

In the foregoing communication method, the base station indicates, to the terminal by using the first indication information, that a priority of the cell-specific transmission is lower than the priority of the second transmission. The following describes another communication method provided in at least one embodiment. Priorities of cell-specific transmission and UE-specific transmission is predefined in a protocol, so that in response to the cell-specific transmission overlapping with the UE-specific transmission in time domain, a terminal determines, according to a rule predefined in the protocol, to perform the cell-specific transmission or the UE-specific transmission.

In at least one embodiment, an example in which first transmission is downlink transmission, and second transmission is uplink transmission is used. A first frequency domain resource corresponds to a first TDD frame structure, a second frequency domain resource corresponds to a second TDD frame structure, the first TDD frame structure on an OFDM symbol occupied by a first transmission occasion is a downlink symbol or a flexible symbol, and the second TDD frame structure on an OFDM symbol occupied by the second transmission is an uplink symbol or a flexible symbol. The downlink symbol, the uplink symbol, and the flexible symbol is determined by using configuration information of a cell common TDD frame structure, or is determined by using configuration information of a UE-specific TDD frame structure, or is determined by using DCI.

It is understood that, to implement functions in the foregoing embodiments, the base station and the terminal include corresponding hardware structures and/or software modules for performing the functions. A person skilled in the art should be easily aware that at least one embodiment is implemented by hardware or a combination of hardware and computer software in combination with the units and the method steps in the examples described in at least one embodiment. Whether a function is performed by hardware or hardware driven by computer software depends on particular application scenarios and design constraints of technical solutions.

Figure 7:
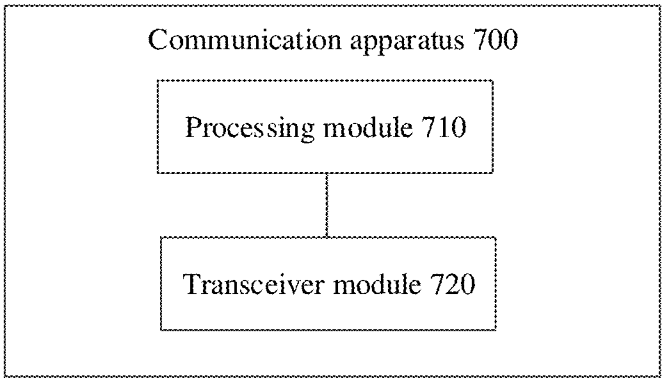
FIG. 7 is a diagram of a structure of a communication apparatus according to at least one embodiment.
Figure 8:
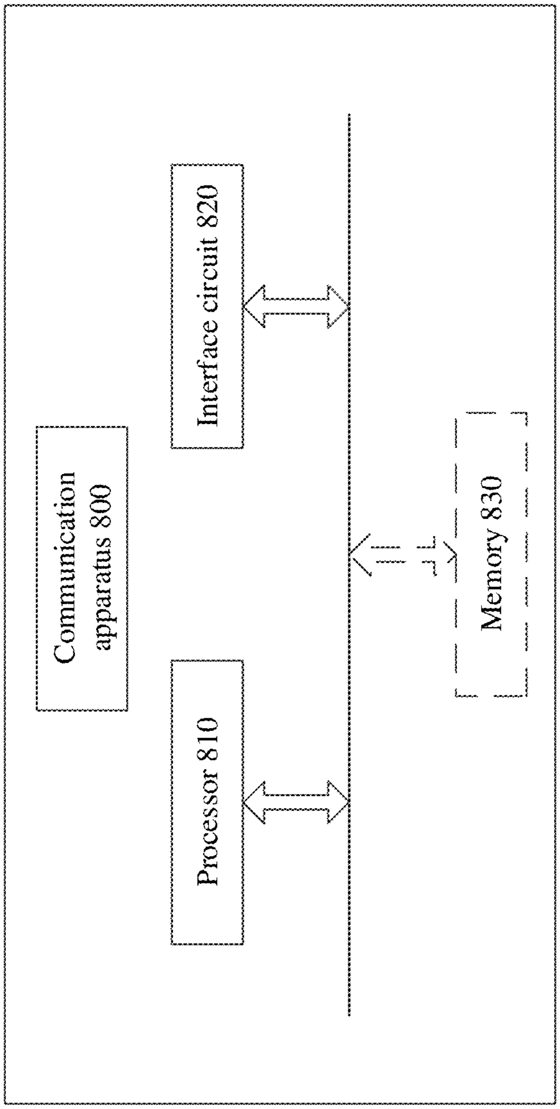
FIG. 8 is a diagram of a structure of a communication apparatus according to at least one embodiment.

FIG. 7 and FIG. 8 are schematic diagrams of structures of communication apparatuses according to at least one embodiment. The communication apparatuses are configured to implement a function of the UE or the base station in the foregoing method embodiments. Therefore, beneficial effects of the foregoing method embodiments are also implemented. In at least one embodiment, each communication apparatus is one of the terminals 120*a* to 120*j* shown in FIG. 2, or is the base station 110*a* or 110*b* shown in FIG. 2, or is a module (for example, a chip) used in a terminal or a base station.

As shown in FIG. 7, a communication apparatus 700 includes a processing module 710 and a transceiver module 720. The communication apparatus 700 is configured to implement a function of the terminal or the base station in the method embodiment shown in FIG. 6.

In response to the communication apparatus 700 being configured to implement the function of the terminal in the method embodiment shown in FIG. 6, the transceiver module 720 is configured to receive first indication information, and the processing module 710 is configured to demodulate and/or decode the first indication information. The transceiver module is further configured to perform second transmission on a second frequency domain resource based on the first indication information.

In response to the communication apparatus 700 being configured to implement the function of the base station in the method embodiment shown in FIG. 6, the processing module 710 is configured to generate first indication information. The transceiver module 720 is configured to send the first indication information. The transceiver module 720 is further configured to perform second transmission on a second frequency domain resource.

For more detailed descriptions of the processing module 710 and the transceiver module 720, directly refer to related descriptions in the method embodiment shown in FIG. 6. Details are not described herein again.

As shown in FIG. 8, a communication apparatus 800 includes a processor 810 and an interface circuit 820. The processor 810 and the interface circuit 820 are coupled to each other. The interface circuit 820 is a transceiver or an input/output interface. Optionally, the communication apparatus 800 further includes a memory 830, configured to: store instructions executed by the processor 810, or store input data used by the processor 810 to run instructions, or store data generated after the processor 810 runs instructions.

In response to the communication apparatus 800 being configured to implement the method shown in FIG. 6, the processor 810 is configured to implement a function of the processing module 710, and the interface circuit 820 is configured to implement a function of the transceiver module 720.

In response to the communication apparatus being a chip used in a terminal, the chip in the terminal implements the function of the terminal in the foregoing method embodiment. The chip in the terminal receives information from another module (for example, a radio frequency module or an antenna) in the terminal, where the information is sent by the base station to the terminal, or the chip in the terminal sends information to another module (for example, a radio frequency module or an antenna) in the terminal, where the information is sent by the terminal to the base station.

In response to the communication apparatus is a module used in the base station, the module in the base station implements the function of the base station in the foregoing method embodiment. The module in the base station receives information from another module (for example, a radio frequency module or an antenna) in the base station, where the information is sent by the terminal to the base station, or the module in the base station sends information to another module (for example, a radio frequency module or an antenna) in the base station, where the information is sent by the base station to the terminal. The module in the base station herein is a baseband chip of the base station, or is a DU or another module. The DU herein is a DU in an open radio access network (O-RAN) architecture.

The processor In at least one embodiment is a central processing unit (CPU), or is another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor is a microprocessor, or is any conventional processor.

The method steps in at least one embodiment are implemented by hardware, or are implemented by the processor by executing software instructions. The software instructions include a corresponding software module. The software module is stored in a random access memory, a flash memory, a read-only memory, a programmable read-only memory, an erasable programmable read-only memory, an electrically erasable programmable read-only memory, a register, a hard disk, a removable hard disk, a CD-ROM, or a storage medium in any other form well-known in the art. For example, a storage medium is coupled to the processor, so that the processor reads information from the storage medium and writes information to the storage medium. Certainly, the storage medium is a component of the processor. The processor and the storage medium are disposed in an ASIC. In addition, the ASIC is located in a base station or a terminal. Certainly, the processor and the storage medium exist in the base station or the terminal as discrete components.

All or some of the foregoing embodiments are implemented by using software, hardware, firmware, or any combination thereof. In response to software being used to implement embodiments, all or some of embodiments are implemented in a form of a computer program product. The computer program product includes one or more computer programs or instructions. In response to the computer programs or instructions are loaded and executed on a computer, all or some of the processes or the functions In at least one embodiment are performed. The computer is a general-purpose computer, a dedicated computer, a computer network, a network device, user equipment, or another programmable apparatus. The computer programs or instructions are stored in a computer-readable storage medium, or are transmitted from a computer-readable storage medium to another computer-readable storage medium. For example, the computer programs or instructions are transmitted from a website, computer, server, or data center to another website, computer, server, or data center in a wired or wireless manner. The computer-readable storage medium is any usable medium that is accessed by a computer, or a data storage device, such as a server or a data center, integrating one or more usable media. The usable medium is a magnetic medium, for example, a floppy disk, a hard disk, or a magnetic tape, or is an optical medium, for example, a digital video disc, or is a semiconductor medium, for example, a solid-state drive. The computer-readable storage medium is a volatile or nonvolatile storage medium, or includes two types of storage media: a volatile storage medium and a non-volatile storage medium.

In at least one embodiment, unless otherwise stated or there is a logic conflict, terms and/or descriptions in different embodiments are consistent and is mutually referenced, and technical features in different embodiments is combined based on an internal logical relationship thereof, to form a new embodiment.

In at least one embodiment, “at least one” means one or more, and “a plurality of” means two or more. “And/or” describes an association relationship between associated objects, and represents that three relationships exist. For example, A and/or B represent the following cases: Only A exists, both A and B exist, and only B exists. A and B each is singular or plural. In the text descriptions of at least one embodiment, the character “/” generally indicates an “or” relationship between the associated objects. In a formula in at least one embodiment, the character “/” indicates a “division” relationship between the associated objects. “Including at least one of A, B, and C” indicates: including A, including B, including C, including A and B, including A and C, including B and C, or including A, B, and C.

Various numbers in at least one embodiment are merely used for differentiation for ease of description, and are not used to limit the scope of at least one embodiment. Sequence numbers of the foregoing processes do not mean execution sequences. The execution sequences of the processes should be determined based on functions and internal logic of the processes.

What is claimed is:

1. An apparatus comprising:

at least one processor; and a non-transitory computer readable medium storing a program executable by the at least one processor, the program comprising instructions for causing the at least one processor to execute operations including:

receiving first indication information, wherein the first indication information is usable to indicate whether a priority of first transmission on a first transmission occasion is lower than a priority of second transmission, wherein the first transmission is a synchronization signal/physical broadcast channel block (SSB) or a physical random access channel (PRACH) on a first frequency domain resource, the second transmission is transmission on a second frequency domain resource, a transmission direction of the first transmission is different from a transmission direction of the second transmission, and the first transmission occasion overlaps with a time domain resource of the second transmission; and performing transmission of the second transmission or reception of the second transmission on the second frequency domain resource based on the first indication information, wherein at least a part of the first transmission that overlaps at least a part of the second transmission is cancelled and the at least part of the first transmission that overlaps with the at least part of the second transmission is discarded.

2. The apparatus according to claim 1, wherein the first transmission is the SSB, and the second transmission is one of a PRACH, a physical uplink shared channel (PUSCH), a physical uplink control channel (PUCCH), or a sounding reference signal (SRS).

3. The apparatus according to claim 1, wherein the first transmission is the PRACH, and the second transmission is one of a physical downlink control channel (PDCCH), a physical downlink shared channel (PDSCH), or a channel state information-reference signal (CSI-RS).

4. The apparatus according to claim 1, wherein the first indication information is usable to indicate, by indicating that the first transmission fails or the first transmission occasion fails, that the priority of the first transmission on the first transmission occasion is lower than the priority of the second transmission.

5. The apparatus according to claim 1, wherein the first transmission is periodic transmission, the first transmission comprises a plurality of transmission occasions, and the first transmission occasion is one of the plurality of transmission occasions;

the first indication information comprises grouping information of the first transmission, and is usable to group the plurality of transmission occasions into M transmission occasion groups, wherein M is an integer greater than or equal to 2; and the first transmission occasion is separate from a first group, and the first group is a group that is associated with a terminal device and that is in the M transmission occasion groups.

6. The apparatus according to claim 5, wherein the grouping information of the first transmission comprises a correspondence between an identifier of the terminal device and the M transmission occasion groups.

7. The apparatus according to claim 6, wherein the identifier of the terminal device is one of a 5G globally unique temporary identity (5G-GUTI), a 5G shorted-temporary mobile subscriber identity (5G-S-TMSI), or a 5G-temporary mobile subscriber identity (5G-TMSI).

8. A communication method comprising:

sending first indication information usable to indicate whether that a priority of first transmission on a first transmission occasion is lower than a priority of a second transmission, wherein the first transmission is a synchronization signal/physical broadcast channel block (SSB) or a physical random access channel (PRACH) on a first frequency domain resource, the second transmission is transmission on a second frequency domain resource, a transmission direction of the first transmission is different from a transmission direction of the second transmission, and the first transmission occasion overlaps with a time domain resource of the second transmission; and performing transmission of the second transmission or reception of the second transmission on the second frequency domain resource, wherein at least a part of the first transmission that overlaps at least a part of the second transmission is cancelled and the at least part of the first transmission that overlaps with the at least part of the second transmission is discarded.

9. The method according to claim 8, wherein the first transmission is the SSB, and the second transmission is one of a PRACH, a physical uplink shared channel (PUSCH), a physical uplink control channel (PUCCH), or a sounding reference signal (SRS).

10. The method according to claim 8, wherein the first transmission is the PRACH, and the second transmission is one of a physical downlink control channel (PDCCH), a physical downlink shared channel (PDSCH), or a channel state information-reference signal (CSI-RS).

11. The method according to claim 8, wherein the first indication information is usable to indicate that the first transmission fails or the first transmission occasion fails, the first indication information is usable to indicate that the priority of the first transmission on the first transmission occasion is lower than the priority of the second transmission.

12. The method according to claim 8, wherein the first transmission is periodic transmission, the first transmission comprises a plurality of transmission occasions, and the first transmission occasion is one of the plurality of transmission occasions;

the first indication information comprises grouping information of the first transmission, and is usable to group the plurality of transmission occasions into M transmission occasion groups, wherein M is an integer greater than or equal to 2; and the first transmission occasion is separate from a first group, and the first group is a group that is associated with a terminal device and that is in the M transmission occasion groups.

13. The method according to claim 12, wherein the grouping information of the first transmission comprises a correspondence between an identifier of the terminal device and the M transmission occasion groups.

14. The method according to claim 13, wherein the identifier of the terminal device is one of a 5G globally unique temporary identity (5G-GUTI), a 5G shorted-temporary mobile subscriber identity (5G-S-TMSI), or a 5G-temporary mobile subscriber identity (5G-TMSI).

15. An apparatus comprising:

at least one processor; and a non-transitory computer readable medium storing a program executable by the at least one processor, the program comprising instructions for causing the at least one processor to execute operations including:

sending first indication information, wherein the first indication information is usable to indicate whether a priority of first transmission on a first transmission occasion is lower than a priority of second transmission, wherein the first transmission is a synchronization signal/physical broadcast channel block (SSB) or a physical random access channel (PRACH) on a first frequency domain resource, the second transmission is transmission on a second frequency domain resource, a transmission direction of the first transmission is different from a transmission direction of the second transmission, and the first transmission occasion overlaps with a time domain resource of the second transmission; and performing transmission of the second transmission or reception of the second transmission on the second frequency domain resource, wherein at least a part of the first transmission that overlaps at least a part of the second transmission is cancelled and the at least part of the first transmission that overlaps with the at least part of the second transmission is discarded.

16. The apparatus according to claim 15, wherein the first transmission is the SSB, and the second transmission is one of a PRACH, a physical uplink shared channel (PUSCH), a physical uplink control channel (PUCCH), or a sounding reference signal (SRS).

17. The apparatus according to claim 15, wherein the first transmission is the PRACH, and the second transmission is one of a physical downlink control channel (PDCCH), a physical downlink shared channel (PDSCH), or a channel state information-reference signal (CSI-RS).

18. The apparatus according to claim 15, wherein the first indication information is usable to indicate that the first transmission fails or the first transmission occasion fails, that the priority of the first transmission on the first transmission occasion is lower than the priority of the second transmission.

19. The apparatus according to claim 15, wherein the first transmission is periodic transmission, the first transmission comprises a plurality of transmission occasions, and the first transmission occasion is one of the plurality of transmission occasions;

the first indication information comprises grouping information of the first transmission, and is usable to group the plurality of transmission occasions into M transmission occasion groups, wherein M is an integer greater than or equal to 2; and the first transmission occasion is separate from a first group, and the first group is a group that is associated with a terminal device and that is in the M transmission occasion groups.

20. The apparatus according to claim 19, wherein the grouping information of the first transmission comprises a correspondence between an identifier of the terminal device and the M transmission occasion groups.

* * * * *